United States Patent

Terashima et al.

[11] Patent Number: 5,898,930
[45] Date of Patent: Apr. 27, 1999

[54] PORTABLE TELEPHONE UNIT FOR PRESERVING DATA THAT IS RENEWED DURING CONVERSATION

[75] Inventors: Kazuhiko Terashima, Tokyo; Takahisa Someya, Kanagawa, both of Japan

[73] Assignee: Sony Corporation, Tokyo, Japan

[21] Appl. No.: 08/696,212

[22] Filed: Aug. 13, 1996

[30] Foreign Application Priority Data

Aug. 17, 1995 [JP] Japan .................................. 7-231934

[51] Int. Cl.⁶ .................................................. H04Q 7/36
[52] U.S. Cl. .......................... 455/550; 455/572; 455/574; 455/38.3
[58] Field of Search ............................... 455/572, 574, 455/575, 38.3, 343, 550, 406

[56] References Cited

U.S. PATENT DOCUMENTS

| | | | |
|---|---|---|---|
| 5,425,079 | 6/1995 | Noda et al. | 379/68 |
| 5,438,695 | 8/1995 | Morimura et al. | 455/343 |
| 5,668,864 | 9/1997 | Kageyama | 379/356 |
| 5,687,216 | 11/1997 | Svensson | 455/412 |

*Primary Examiner*—Dwayne D. Bost
*Assistant Examiner*—Leonard Baker
*Attorney, Agent, or Firm*—Jay H. Maioli

[57] ABSTRACT

A buffer memory, an electrically erasable and writable ROM, a capacitor for holding a voltage, and a voltage detection circuit for detecting the voltage of a battery for a power source are provided in a portable telephone unit. During conversation, data to be saved is written into the buffer memory. At the time of ending the conversation, the data written in the buffer memory is transferred to a ROM and written therein. When the voltage detection circuit detects that the voltage of the battery is unobtainable, the buffer memory and the ROM are operated and the data written in the buffer memory is also transferred to the ROM and written therein by the voltage held in the capacitor.

5 Claims, 1 Drawing Sheet

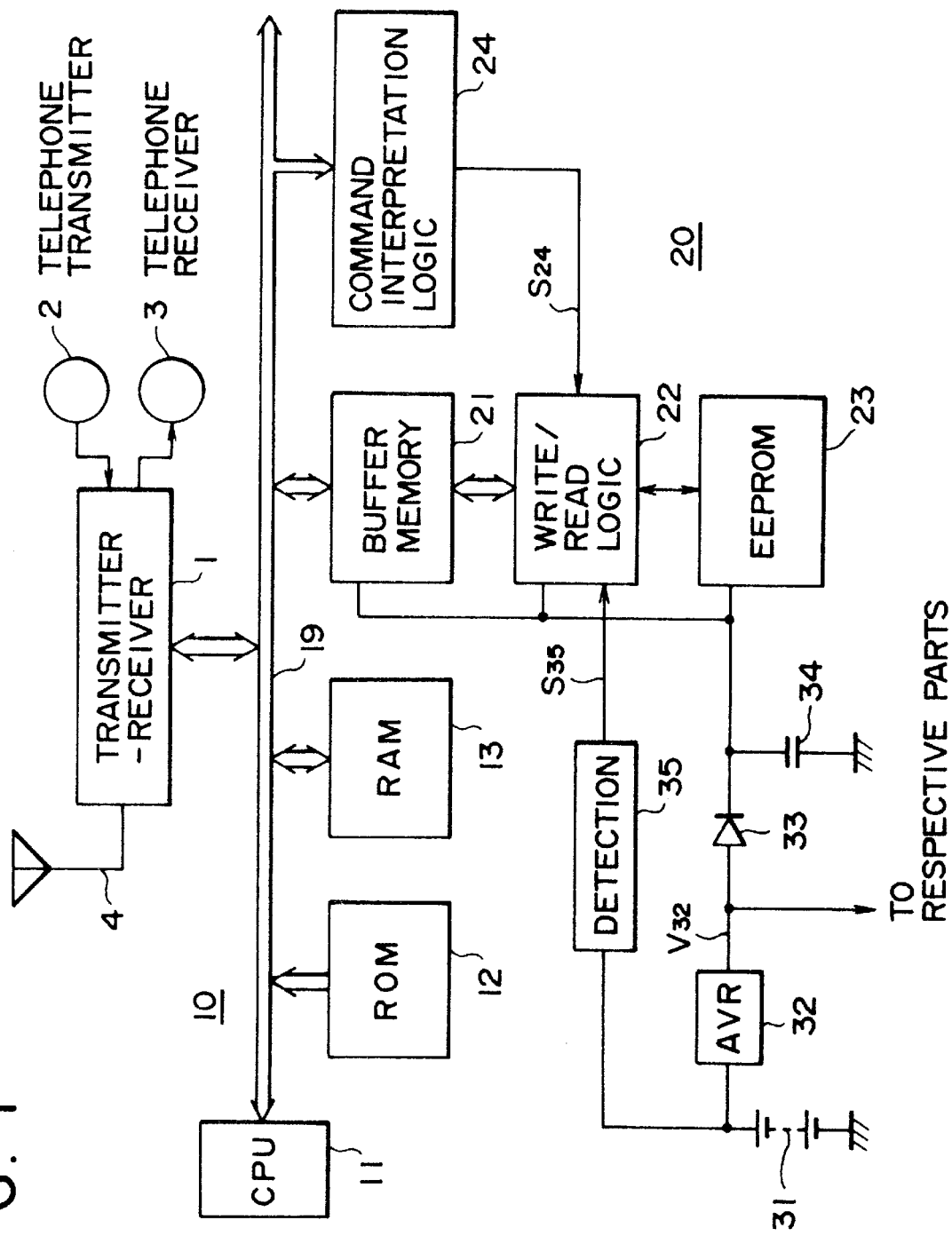
F I G. I

PORTABLE TELEPHONE UNIT FOR PRESERVING DATA THAT IS RENEWED DURING CONVERSATION

BACKGROUND OF THE INVENTION

1. Field of the Invention

The present invention relates to a portable telephone unit and more particularly to a portable telephone unit being capable of preserving data updated during a conversation.

2. Description of Related Art

In a portable telephone unit, there are several tens of bytes of data that are renewed every second such as billing information and conversation time, but there are some types of such data which are held in an internal memory. Further, as such a memory, an electrically erasable and writable read-only memory (ROM), which is a so called an electrically erasable programmable read-only memory (EEPROM), is used in general.

Now, in a portable telephone unit, it is made so that a charging type battery for a power source can be removed comparatively easily for the purpose of exchange or the like. Further, the battery gets out of place sometimes by a shock and so on.

Now, in case a memory of parallel interface is used as an EEPROM for holding said data, when a battery is removed, such a fact is detected by a voltage detection circuit and said data is written in the EEPROM immediately. Further, the power source for the period when the write is executed is secured by the charging voltage of a capacitor.

In a portable telephone unit, however, LSI chips are used widely for the purpose of miniaturization of an apparatus and so on. Therefore, current power consumption during the period when data is written in the EEPROM is increased, thus resulting in that the capacity of a capacitor for supplying power during the write period has to be made larger, which prevents miniaturization of a telephone set.

Further, when a memory of series interface is used as the EEPROM, the time required for writing of data is protracted. Therefore, it is still impossible to cover the time required for writing the data with the charging voltage of a capacitor. Thus, the data is written in the EEPROM every second during normal time, too.

However, the writable number of times of an EEPROM is approximately a hundred thousand times in general, and, even when the use time of a portable telephone unit is two minutes a day, the number of write times reaches 87,600 number of times in two years (=60 seconds×2 minutes×365 days×2 years), and it is therefore required to exchange the EEPROM in approximately two years, thus shortening the life of a product.

Furthermore, there is also a method that a RAM is backed up with a primary battery so as to make it nonvolatile, but, in order to back up the RAM for several years with a primary battery only, the capacity of the primary battery has to be made larger.

The present invention has been made for the purpose of solving such problems as described above.

SUMMARY OF THE INVENTION

According to the present invention, even when a built-in battery is removed and so on and the voltage of the built-in battery is interrupted, the data to be saved will never be left out. Further, even when the number of writable times of the EEPROM is small, the life of the product will never be shortened. Furthermore, it is possible to miniaturize a capacitor for a power source, and, as a result, miniaturization of a telephone set will never be prevented. Further, a primary battery for making the memory nonvolatile is neither required, and miniaturization becomes possible from this point, too.

A portable telephone unit according to the present invention is a portable telephone unit capable of preserving data that is renewed during a conversation, which is provided with a battery for a power supply, a voltage holding circuit for holding the output voltage of the battery, a voltage detecting circuit for detecting the output voltage of the battery, a data preserving circuit which has a buffer memory in which data renewed during conversation can be written and an erasable and writable read only memory and in which the output voltage of the battery is supplied through a voltage holding circuit, wherein, when the voltage detecting circuit detects that the output voltage of the battery is inappropriate, the data preserving circuit is operated at the voltage held in the voltage holding circuit, and the data written in the buffer memory is read out and written in the read only memory.

BRIEF DESCRIPTION OF THE DRAWINGS

FIG. 1 is a connection diagram showing an example of the present invention.

DESCRIPTION OF THE PREFERRED EMBODIMENTS

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

In FIG. 1, a reference numeral 1 represents a transmitter-receiver circuit, and an aural signal from a telephone transmitter 2 is converted into a transmission signal of an up-channel by the transmitter-receiver circuit 1 and transmitted from a transmitting/receiving antenna 4 to a base station (not shown) at time of the conversation. Further, a signal of a down-channel from the base station is received by the antenna 4, this received signal is supplied to the transmitter-receiver circuit 1 and the aural signal of the other party is taken out, and this aural signal is supplied to a telephone receiver 3. Furthermore, various commands and data accessed between the portable telephone unit and the base station are also transmitted and/or received by the transmitter-receiver circuit 1.

Further, a reference numeral 10 denotes a microcomputer for system control for performing the processing of commands and data and so on. Further, in this microcomputer 10, 11 represents a CPU functioning as a principal processing controller, 12 represents a ROM in which various programs have been written, and 13 represents a RAM for a work area. Further, these memories 12 and 13 are connected to the CPU 11 through a parallel system bus 19. Further, signal lines of the commands and data transmitted and/or received by the transmitter-receiver circuit 1 are also connected to the system bus 19.

Furthermore, a conservation circuit 20 for saving various data required to be saved such as billing information and conversation time is provided. Namely, a buffer memory 21 is connected to the bus 19, and an EEPROM 23 is also connected to this buffer memory 21 through a write/read logic circuit 22.

In this case, the buffer memory 21 is for inputting and outputting data such as billing information in parallel and also for holding the data temporarily, and is formed to have a size of several tens of bytes corresponding to the data quantity. Further, the logic circuit 22 reads data out of the buffer memory 21 in parallel, converts this data into series data and writes it in the EEPROM 23, and also reads the data in series from the EEPROM 23, and converts this data into parallel data and writes it in the buffer memory 21. Furthermore, the EEPROM 23 has the capacity of several tens of bytes corresponding to the data quantity of data to be saved.

Further, a command interpretation logic circuit 24 is connected to the bus 19, and an output signal S24 thereof is supplied to the logic circuit 22.

Furthermore, a charging type battery (a secondary battery) 31 is included inside, the output voltage thereof is supplied to a constant-voltage circuit 32 and stabilized. Further, the output voltage V32 of the constant-voltage circuit 32 is supplied to the power lines of the circuits 21 to 23 through a diode 33 for reverse current prevention. A capacitor 34 for holding voltage is also connected between the output side of the diode 33 and the ground. The stabilized voltage V32 is supplied also to respective parts except circuits 21 to 23 as the working voltage thereof.

Furthermore, a voltage detection circuit 35 is connected to the battery 31 so as to detect whether the voltage of the battery 31 is obtainable or not, and the detected output S35 is supplied to the logic circuit 22.

In such a structure, since the output voltage V32 of the constant-voltage circuit 32 is supplied to respective parts and is also supplied to the circuits 21 to 23 through the diode 33 at stationary time, the respective parts can perform original operations so as to make a call or the like.

Further, at the time of a conversation, the data to be saved such as billing information and conversation time are written every second in the buffer memory 21 by means of the CPU 11 and renewed succeedingly.

Further, when the conversation is completed and clearback processing is executed, a predetermined command is written in the logic circuit 24 by means of the CPU 11. Then, this command is interpreted by the logic circuit 24, and the logic circuit 22 is started by an output signal S24 of the logic circuit 24. As a result, the data of the buffer memory 21 is read out by the logic circuit 22 and is converted into series data from parallel data, and this series data is written in the EEPROM 23 by means of the logic circuit 22. Thus, the values (data) at clear-back time of data to be saved in the buffer memory 21 is saved in the EEPROM 23.

On the other hand, when the appropriate output voltage from the battery 31 becomes unobtainable due to a certain cause or the fact that the battery 31 is removed during the conversation, such a fact is detected by a detection circuit 35 and a detected signal S35 is supplied to the logic circuit 22. Then, the logic circuit 22 is started by a detected signal S35, and, similarly to the case by the signal S24, the data of the buffer memory 21 is read out by the logic circuit 22 and converted into serial data from parallel data. This series data is written in the EEPROM 23 by means of the logic circuit 22. Thus, present values (data) of the data to be saved in the buffer memory 21 are saved in the EEPROM 23.

Further, in this case, although the voltage of the battery 31 is unobtainable during the period when the data of the buffer memory 21 is transferred to the EEPROM 23, transfer of this data is executed normally because the charging voltage of the capacitor 34 is supplied to the circuits 21 to 23 as the working voltage thereof.

Besides, when a predetermined command is written in the logic circuit 24 from the CPU 11, it is interpreted by the logic circuit 24, the logic circuit 22 is started by the output signal S24 of the logic circuit 24, the data of the EEPROM 23 is read out by the logic circuit 22 and also converted into parallel data from serial data, and this parallel data is written in the buffer memory 21 by means of the logic circuit 22. Accordingly, it is possible thereafter for the CPU 11 to learn of the billing information, conversation time and so on up to that time by referring to the data of the buffer memory 21.

As described above, renewed values are always conserved for the data to be conserved such as the billing information and conversation time. In this case, however, according to this portable telephone unit, even when the data is renewed every second at the time of the conversation, renewal of this data is made by means of the buffer memory 21, and the data resulting from renewal is written in the EEPROM 23 at the time of renewal. Therefore, even when the number of writable times of the EEPROM 23 is approximately hundred thousand times, the life of the product will never be shortened.

Further, even when the battery 31 is removed and so on and the voltage of the battery 31 is interrupted, the data of the buffer memory 21 at that time is written in the EEPROM 23. Therefore, the data to be saved will never be left out.

Furthermore, since only the circuits 21 to 23 are operated when the data of the buffer memory 21 is transferred to the EEPROM 23 in case the voltage of the battery 31 is interrupted, it is not required to make the capacitor 34 for providing the working voltage of the circuits 21 to 23 to have a large capacity, thus making it possible to miniaturize the capacitor 34. As a result, miniaturization of the telephone set is not prevented.

Further, a primary battery for making the memory non-volatile is not required, and miniaturization can also be expected from this point.

What is claimed is:

1. A portable telephone unit for preserving data that is renewed during conversation, comprising:

a battery forming a power supply;

a voltage holding circuit for holding an output voltage of said battery;

a voltage detecting circuit for detecting said output voltage of said battery; and a data preserving circuit having a buffer memory in which said data that is renewed during conversation is written and an erasable and writable read only memory, said data preserving circuit being supplied with said output voltage of said battery through said voltage holding circuit, wherein when said voltage detecting circuit detects that said output voltage of said battery is inappropriate, said data preserving circuit is operated at said output voltage held in said voltage holding circuit, and said data renewed during conversation which has been written in said buffer memory is read out and written in said erasable and writable read only memory.

2. The portable telephone unit according to claim 1, wherein said data preserving circuit further includes a write/read logic circuit, and said write/read logic circuit reads said data written in said buffer memory and writes said data in said erasable and writable read only memory in response to a detection signal from said voltage detecting circuit representing that said output voltage of said battery is inappropriate.

3. The portable telephone unit according to claim 1, wherein said output voltage of said battery is supplied to a plurality of portions of said portable telephone unit other than said data preserving circuit without passing through said voltage holding circuit.

4. A portable telephone unit for preserving data that is renewed during conversation, comprising:

a battery forming a power supply;

a voltage holding circuit for holding an output voltage of said battery;

a voltage detecting circuit for detecting said output voltage of said battery;

a controller; and a data preserving circuit having a buffer memory, an erasable and writable read only memory, and a write/read logic circuit, said data preserving circuit being supplied with said output voltage of said battery through said voltage holding circuit, wherein during a conversation, said controller writes said data that is renewed in said buffer memory, and when said conversation is terminated, said write/read logic circuit reads out said data that has been written in said buffer memory and writes said data in said erasable and writable read only memory based on an instruction from said controller and when said voltage detecting circuit outputs a detection signal representing that said output voltage of said battery is inappropriate, said write/read logic circuit reads out said data that has been written in said buffer memory and writes said data in said erasable and writable read only memory in response to said detection signal.

5. The portable telephone unit according to claim 4, wherein said output voltage of said battery is supplied to a plurality of portions of said portable telephone unit other than said data preserving circuit without passing through said voltage holding circuit.

* * * * *